Jan. 25, 1966  J. T. HUTTON ET AL  3,231,386
PROCESS FOR PRODUCING INSTANTIZED PRODUCTS
Filed Nov. 19, 1962
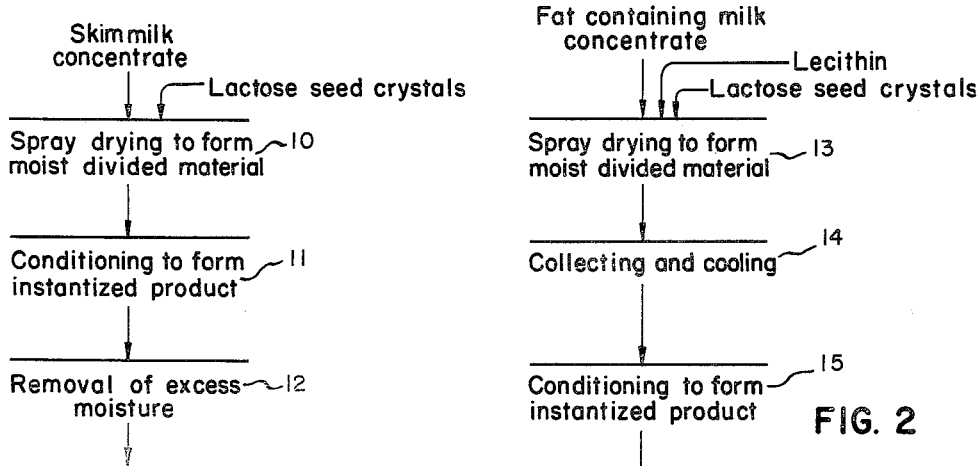
FIG. 1
FIG. 2
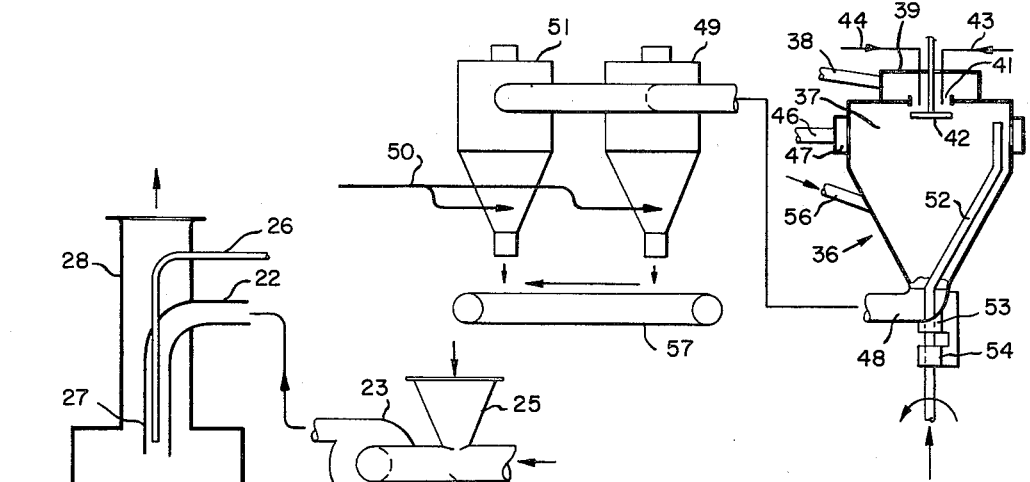
FIG. 3
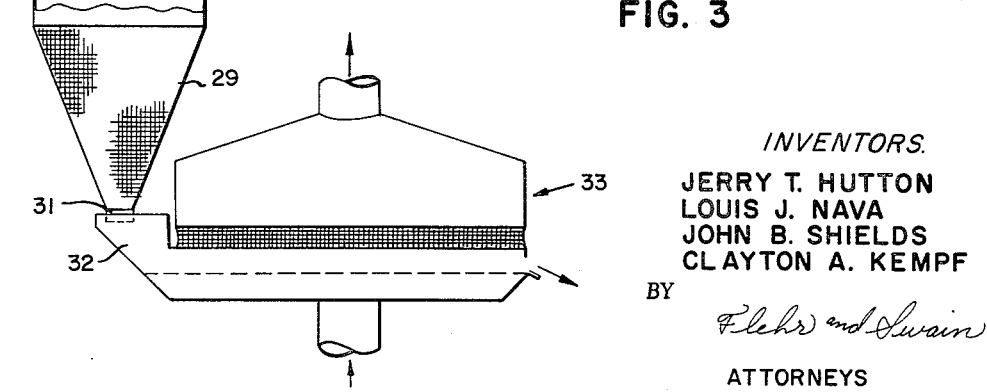
*INVENTORS.*
JERRY T. HUTTON
LOUIS J. NAVA
JOHN B. SHIELDS
CLAYTON A. KEMPF
BY
*Flehr and Swain*
ATTORNEYS : 3,231,386
Patented Jan. 25, 1966

3,231,386
PROCESS FOR PRODUCING INSTANTIZED
PRODUCTS
Jerry T. Hutton, Novato, Louis J. Nava, Redwood City, John B. Shields, Sunnyvale, and Clayton A. Kempf, Berkeley, Calif., assignors to Foremost Dairies, Inc., San Francisco, Calif., a corporation of New York
Filed Nov. 19, 1962, Ser. No. 238,601
9 Claims. (Cl. 99—56)

This application is a continuation-in-part of our copending application Serial No. 56,531, filed September 16, 1960, now abandoned.

This invention relates generally to the manufacture of dry food products in instantized form.

Many food products that have been produced in powdered form by coventional spray drying, are known to be difficult to disperse in cold water, due mainly to poor wettability and the tendency to form sticky lumps. Of recent years, dry skim milk in particular has been made in the so-called instant form. Instant skim milk differs from the normal spray dried product in that it has good wettability, and it can be readily dispersed in cold water by simple stirring to form a stable reconstituted milk. In contrast with the small particle size possessed by conventional spray dried skim milk, the individual fragments of the instantized product are in the form of porous aggregates which may have a size such that the bulk of the fragments remain upon a 100 mesh screen. Such an aggregated product has high wettability, wereby when a quantity of the powder is deposited upon the surface of cold water, the mass quickly wets and sinks in a short interval, and readily disperses upon simple stirring with a spoon, without the formation of sticky lumps.

Processes used in the past for the commercial manufacture of instant skim milk powder have either produced the desired aggregated form by the straight through process, commencing with a liquid concentrate and proceeding directly to the formation of moist porous aggregates, or by the wet back process involving moistening spray dried powder to make the individual particles sticky, and causing the sticky particles to be brought into random contacts to form the porous aggregates. A straight through process is disclosed in Sharp et al., 2,921,857, granted January 19, 1960. Particularly, the Sharp process involves the spray drying of a milk concentrate with seed crystals of lactose. This operation can be carried out by the use of spray drying equipment of the Peebles type (see Patent 2,575,119), making use of a centrifugal atomizer, and with withdrawal of the moist discrete product from the lower conical end portion of the drying chamber. The seeding technique may utilize the invention disclosed and claimed in Terrett et al., 2,970,057. The moist porous aggregates obtained from such a spray drying operation may be passed through a scroll device such as disclosed in said Patent 2,921,857, and thereafter supplied to suitable dryers where excess moisture is removed.

In instances where the wet back process is used for making instantized products, the procedure can be as disclosed in Peebles 2,835,586. Thus, a finely divided anhydrous milk powder, such as commercial spray dried skim milk, is supplied to a hydrating chamber where it is commingled with moist steam or atomized particles of water, whereby the powder particles are moistened and made sticky. The sticky particles are brought into random contacts whereby moist porous aggregates are formed. Thereafter, the moist aggregates are subjected to drying for the removal of excess moisture.

In general, the straight through process and equipment are somewhat simpler than the wet back process and apparatus, particular because in the straight through process formation of moist aggregates takes place in the spray drying chamber, and it is not necessary to reduce the liquid milk to the form of an anhydrous powder. However, the straight through process has the disadvantage that careful control must be exerted to insure the relatively uniform formation of aggregates of the desired size. Also, there is a tendency for the percentage of fines in the final product to become excessive. Fines in the final product are not readily wettable, and therefore as the percentage of fines increases, over-all wettability is reduced.

In general, it is an object of the present invention to provide an instantizing process and apparatus having the desirable properties of the straight through process described above, without its disadvantages.

More specifically, it is an object of the present invention to provide an instantizing process and apparatus which avoids formation of an anhydrous powder, before instantizing, and which forms moist porous aggregates from moist discrete material in a separate conditioning operation.

Another object of the invention is to provide an instantizing process and apparatus which is well adapted for producing instantized dried milk and milk products.

Another object of the present invention is to provide an instantizing process and apparatus which can be utilized for the manufacture of various food products, including products other than the above mentioned instantized dry milk.

Additional objects and features of the invention will appear from the following description in which the preferred embodiments have been set forth in detail, in conjunction with the accompanying drawing.

Referring to the drawing:

FIGURE 1 is a flow sheet illustrating one procedure for carrying out the invention;

FIGURE 2 is another flow sheet illustrating another embodiment of the invention, particularly intended for the manufacture of instantized dry whole milk;

FIGURE 3 is a schematic view illustrating apparatus for carrying out the process.

In accordance with the present invention, we employ a special conditioning operation which acts upon moist discrete material, and converts it to the form of instantized moist porous aggregates. We prefer to produce the moist discrete material by a spray drying operation, but without maintaining such conditions as would promote more than incidental aggregation, such as are maintained in the process of Sharp et al., 2,921,857, wherein the major portion of the material is caused to form moist porous aggregates in the spray drying chamber. After conversion of the moist discrete material into the form of porous aggregates in the conditioning operation, a final drying operation serves to remove excess moisture. Preferably, the material undergoing treatment moves continuously through the spray drying operation, the special conditioning operation, and finally, the drying operation for the removal of excess moisture.

In the flow sheet of FIGURE 1, skim milk concentrate is shown being supplied to the spray drying operation 10, which converts the concentrate to the form of a moist divided material. This material is then supplied to the special conditioning operation 11, which is shown receiving steam and moisture, and in which the moist porous aggregates are formed. The aggregated material from operation 11 passes to step 12, where excess moisture is removed to form the final product.

Various known techniques can be used to produce a skim milk of the desired concentration for spray drying. Thus, if a low heat product is desired, H.T.S.T. pasteurization may be preferred. Generally, the evaporator employed is fed with milk at a temperature in the range of from 170° to 185°, with five to ten seconds holding time as a practical minimum. If a higher heat product is desired, higher temperatures and/or longer holding times may be employed, according to the suitability of the available plant equipment. For conventional concentrating by vacuum evaporation, one may first produce a concentrate of 25 to 35% solids, which is cooled and stored for further concentration. Thereafter, such concentrate can be heated to a temperature level of 160 to 200° F., and supplied to a vacuum evaporator to produce a concentrate of the order of 44 to 48% solids. A simpler procedure is to evaporate directly to the desired solids content. In general, it has been found that a solids content of about 46% atomizes satisfactorily.

The precise procedure followed for spray drying, may vary in different instances, depending upon various factors, including the particular equipment available. As supplied to the centrifugal atomizer of the spray dryer, it is desirable to have the concentrate at a temperature greater than ambient, such as within a range of from 110 to 170° F. The choice of temperature is not critical but appears to have some influence upon the fineness of the particle size obtained by the spray drying operation, and this, in turn, has some influence on the bulk density of the final product. It has been observed that the lowering of this concentrate temperature tends to produce a denser end product, and conversely, raising of the temperature tends to produce a lighter product. In the atomization of this concentrate by rotary atomizers, the atomizer rotation speed will vary with the atomizer diameter and design, as is recognized in the art. Generally, atomizers of suitable design and about 12½ inch diameter, will function favorably at a speed of the order of 12,500 r.p.m. As is well understood, atomizer baskets of smaller diameter require higher rotative speeds.

The moist spray dried material is seeded with lactose crystals. This serves to stabilize the process, and aids in producing a final product having a substantial part of its lactose content in the form of crystalline alpha lactose monohydrate. Such a product is relatively nonhygroscopic, in contrast with a product having substantially all of its lactose content in the anhydrous non-crystalline form. The feeding of lactose crystals can be carried out as disclosed and claimed in Sharp et al., 2,921,857. Preferably, lactose seed crystals are fed to the centrifugal atomizer whereby the crystals are dispersed in the atomized particles. One satisfactory procedure is to feed the finely divided crystalline lactose to the atomizer at a metered rate, simultaneous with feeding of the milk concentrate, in such a manner that the crystals are sucked into the atomizer by aspirating action. In other words, a quantity of air is continuously being sucked into the throat of the atomizer, and this air stream is employed to carry with it the finely divided crystalline lactose in an amount sufficient to accomplish the desired seeding. The equipment employed for feeding the crystals preferably is quickly adjustable to change the feed rate to that desired. In practice, it has been found that an adjustable feeder of the Syntron type is satisfactory. Generally, the quantity of seed crystals required will not exceed 0.25% of the milk solids, on a dry solids basis, and in some instances may be substantially less, depending upon the bulk density required in the finished product.

The spray dryer can be controlled by setting the inlet air temperature at a range which may for example be from 250 to 350° F. or higher. Higher operating inlet temperatures provide increased production capacity, and therefore it is generally desirable to operate at the upper temperature level of from about 290 to 350° F. or even higher. Usually this temperature is selected and allowed to remain substantially constant, and the spray drying operation is controlled by adjusting (a) the rate of feed of the concentrate to the atomizer, (b) the rate of supply of seed crystals to the atomizer, and (c) the control of secondary air entering the collecting cyclones that are connected to the outlet of the spray dryer.

The spray drying operation is controlled whereby the moisture content of the divided material obtained may be of the order of 6 to 10% (as determined from samples taken at the powder outlet of collecting cyclones connected to the spray dryer). A certain amount of the discrete material may be visibly agglomerated, but the control conditions are such that no effort is made to cause the major part of the material to be agglomerated, as in the process of Sharp et al., 2,921,857. Because of the use of lactose seed crystals, under microscope examination (e.g., under polarized light at 100× magnification) some lactose crystals are identifiable in the moist material. The individual primary particles are generally spherical, with some adhered together as clusters. The crystallized lactose in the moist material from the dryer has its origin not only with the seed crystals, but also represents lactose that crystallizes during and immediately following spray drying. The lactose which is not crystallized is in the form of a hydrous concentrate.

Following the spray drying operation 10, it is convenient to collect the moist discrete material by the use of conventional separating cyclones. During the course of such handling and collecting, the temperature of the material may drop from a temperature level of about 110 to 125° F., to a level about 85 to 115° F.

In the conditioning operation 11 the moist discrete material is dispersed in a hot moist atmosphere of steam and water droplets, whereby the particles are caused to take on added moisture and become sticky. Assuming that the dispersed material as it enters the conditioning operation is at a temperature within the range of 85 to 115° F., then in the conditioning operation the temperature is rapidly elevated (i.e., flash heated) to a level within the range of 120 to 160° F. Also assuming that the moist material enters the conditioning operation at a moisture content within the range of about 6 to 10%, the moisture content in the conditioning operation is increased by an added 1 to 6.5%, whereby the aggregates from the operation 11 may have a total moisture content within the range of from 11 to 16.5%. In the conditioning operation the sticky particles are brought into random contacts whereby they are caused to adhere together to form porous moist aggregates of the desired size. Suitable apparatus for carrying out this conditioning operation will presently be described in connection with FIGURE 3.

Following the conditioning operation which converts the moist material into the form of moist porous aggregates, excess moisture is removed in step 12 to produce the final dried product. The handling of the aggregates following step 11, and the equipment utilized for removing excess moisture, should be such as to minimize crushing or grinding, thereby avoiding the braking up or crushing of the aggregates. Thus for final drying the aggregates can be passed through a series of shaker dryers of the type described in Peebles 2,835,586. In a typical instance the temperature of the drying air employed may be within the range of about 250 to 325° F. The final dried material may be sized by conventional screening methods. For example, material under 100 mesh screen size may be returned to the process, and oversized material greater than say 14 mesh, may be subdivided by crushing. The moisture content of the final material may range from about 1.5 to 4%.

Assuming that the source material is fat-containing milk, such as whole milk, instead of nonfat milk like skim milk, the procedure can be as shown in FIGURE 2. However to promote wettability of the final product, we incorporate a small amount of lecithin in the spray drying step 13, as disclosed in copending application Serial No. 672,893, filed July 19, 1957, entitled "Dry Milk Product and Process of Manufacture," now abandoned. Particularly lecithin in liquid form can be supplied to the centrifugal atomizer of the spray dryer, in the manner disclosed in copending application entitled "Dry Milk Product and Process of Manufacture," Serial No. 53,498, filed September 1, 1960, now Patent No. 3,126,289, dated March 24, 1964.

As is well known, lecithin is the commercial or popular name for a crude mixture of compounds which may be more accurately designated as phosphatides or phospholipids. The phosphatides are complex organic compounds that are similar to fats or lipids, but differ from fats radically enough to give them unique properties. Lecithins of vegetable oil origin are mixtures of phosphatides produced from such raw materials as cottonseed oil, corn oil, or soybean oil. Products from current commercial treatments modify natural lecithin to emphasize either the lipophilic groups or the hydrophilic groups, and may be used for our purpose. Commercially available soya lecithin has been used with good results. It is commercially available as a liquid material with lecithin dispersed in a soybean oil or other suitable carrier. Assuming that the liquid lecithin product contains about 60% lecithin, to obtain a final product containing from say 0.17 to 0.6% lecithin, from 0.25 to 1.0% of the lecithin product can be employed.

The increased wettability and dispersibility imparted by the lecithin is attributed to the surface effect produced by utilizing lecithin as an extraneous material. In other words, the lecithin content is not homogeneously dispersed in the fat content of the material, as would be the case if the lecithin were homogenously incorporated in the liquid milk prior to spray drying.

In general, the desired properties can be imparted to a marked degree by incorporating lecithin in amounts as low as 0.1%. However, best results are obtained with the lecithin content at the level of about 0.5% (0.83% commercial soya lecithin product). A desirable range is from about 0.1 to 1.0%, although greater percentages can be used if desired.

The remaining steps shown in FIGURE 2 include cooling and collecting 14, conditioning 15, and final drying 16, all as previously described with reference to FIGURE 1. The moisture content of the material is collected from step 13 may be within the range of about 6 to 14% and from step 15 from 12.0 to 16.5%.

With respect to the moisture content of milk products in general, it may be stated that the over-all range after conditioning is from about 10 to 18%, and as collected before conditioning from about 6 to 14%.

FIGURE 3 schematically illustrates suitable apparatus for carrying out the process. The conditioner 20 consists of a chamber 21 having provision for introducing the moist divided material and for removing the moist aggregates. The moist material is introduced by way of conduit 22, which is shown connected to the discharge side of the blower 23. Preferably the inner portion of this conduit is heat insulated. Suction conduit 24, extending to the blower, may draw in atmospheric air, and is connected with the feed hopper 25 into which the moist spray dried material is introduced. Thus the moist divided material is dispersed in air and then introduced continuously into one end of the chamber 21 through the conduit 22. Pipe 26 serves to introduce a controlled mixture of steam and water, and has its inner end 27 located near the inner open end of the conduit 22. Pipe 26 connects to a suitable source of steam under pressure. The desired percentage of water in the steam can be produced by continuously introducing a controlled amount of water into the steam line, or by passing the steam through a suitable condenser section.

Preferably chamber 21 is vented to the atmosphere through the conduit 28, which may be heat insulated. The lower bottom portion 29 of the chamber 21 may be made of canvas or like flexible material. Moist aggregates formed in the chamber 21 are delivered through the lower outlet 31, which preferably connects directly with the inlet hopper 32 of the dryer 33. This dryer may be the first one of a series of shaker dryers through which the material passes. Dryers of this type, which pass drying air through a bed of the material on a shaking screen, are described in Peebles 2,835,586.

Operation of the conditioner shown in FIGURE 3 is as follows. A hot moist atmosphere is maintained in the chamber 21 by steam entering through pipe 26. The steam intermingles with the air and moist divided material being introduced by way of conduit 22. Assuming that the divided material is at a temperature level within the range of say from 85 to 115° F., rapid heat transfer occurs from the hot moist atmosphere to the moist particles, with the result that the moist particles are flash heated to an elevated temperature level of the order of from 120 to 160° F. In addition, some moisture is added to the particles as previously described. By virtue of the elevated temperature and the application of some additional moisture, the particles are caused to become sticky, and as they progress through the chamber 21 they are brought into random contacts whereby the particles adhere together in the form of moist porous aggregates. After being discharged from chamber 21, the aggregates are subjected to final drying in the dryers 33.

FIGURE 3 also illustrates spray drying apparatus that may be used for producing the moist discrete material. Briefly it consists of a special spray dryer 36 comprising a chamber 37, which has its upper portion supplied with hot drying air through conduit 38 and plenum chamber 39, and thence downwardly through orifice 41. A centrifugal atomizer head 42 is disposed in the upper part of the chamber, and is supplied with liquid concentrate as indicated by the line 43. Line 44 represents introduction of lactose crystals into the atomizer head, assuming that seed crystals are being employed in the spray drying process. Additional hot drying air may enter the chamber 37 through a conduit 46 and plenum chamber 47, in accordance with the disclosure of Patent No. 2,970,057. Conduit 48 connects with the lower end of the dryer chamber, and delivers the material to one or more separating cyclones 49, 51. The conical shaped walls of the chamber 37 are cyclically swept by air jets discharging from the pipe 52. This pipe is carried by suitable bearings 53 and 54, and connected with suitable means whereby it is rotated continuously at the desired controlled rate. The pipe is provided with openings or slots (not shown) through which air is discharged, with impingement of such air jets against the inner surfaces of the chamber walls. A conduit 56 may connect with the dryer chamber for introducing fines from the dryers 33. The cyclones 49 and 51 are shown supplied with secondary air (pipes 50), and deliver the moist divided material to a suitable conveyor 57, which may be of the endless belt type. The material is then delivered into the hopper 25.

Within the spray drying chamber drying conditions are controlled and maintained as previously described whereby the material being delivered through the outlet conduit 48 and collected by cyclones 49, 51 has a moisture content within the desired range. As previously stated, in practice it has been found that for milk products the moisture content may be within the range of from about 6 to 13.5%. More generally the moisture content is above about 6%, and within a range such that the material takes on the characteristics of a dry material. Excessive moisture at this point results in a material which cannot remain or be handled as discrete material, for the various materials that we deem to be adaptable to processing, it is considered that the upper moisture limit is about 25%. In general the optimum moisture range tends to be higher as the percentage of inert solids is increased.

The rate with which the sweep pipe 52 is rotated may vary with different installations, and with the material being processed. However in general the rate of rotation should be sufficient, together with the pressure of air supplied to the pipe 52, to maintain the inner surfaces of the walls substantially clean. In other words, the air sweep removes substantially all the accumulated layer of material. In this way retention of the material within the drying chamber for unduly long periods of time is avoided.

With respect to the complete system shown in FIGURE 3, it will be seen that the spray dryer 36, the conditioner 20, and the final dryer 33, operate continuously with substantially continuous flow of material.

In the foregoing particular reference has been made to the processing of milk, such as skim milk and whole milk. The process is also deemed to be applicable to instantizing products containing milk together with other solids, such as sugar and flavoring ingredients. With respect to the processing of fat-containing milk, other fats or fat-like substances can be substituted for all or a part of the butter fat content. Such fats should be edible, and relatively free from fatty acid. For example, reference can be made to any one of a number of edible vegetable oils such as cottonseed, peanut, and corn oils. Such oils may have been subjected to conventional refining treatments, or to partial hydrogenation.

The percentage of fat contained in the milk may vary. Normal whole milk contains about 26% of fat (dry solids basis). Special low fat milks that may be processed have fat contents ranging down to as low as 5%. Also the fat content may be higher than that of normal whole milk, as for example as high as 40% fat.

Our process and apparatus are deemed to be applicable for instantizing food products other than milk. Thus for producing instantized starch products as described in Patent No. 2,856,290, an aqueous mixture can be prepared from starch particles and lactose, to produce a slurry suitable for spray drying. The solids content may consists, for example, of 85% starch, and 15% lactose. Instead of utilizing lactose by itself an equivalent amount of skim milk or whey can be employed (e.g., 75% starch and 25% skim milk). The spray drying operation can be carried out to provide discrete material having a moisture content within the range of from about 15 to 20%, and the conditioning operation can be carried out whereby the aggregates have a total moisture of the order of from 20 to 25%. The final product may have a moisture content of from 2 to 5%.

For producing an instantized lactose of the type described in Patent No. 2,856,318, a lactose concentrate can be prepared which may contain say 60% solids, and this concentrate is subjected to controlled spray drying to produce a discrete material having a moisture content of the order of 4 to 8%. This material is passed through the conditioning operation, where the discrete material is converted to the form of moist porous aggregates, which may have a moisture content within the range of from 6 to 12% (total). Excess moisture is then removed to provide a final product which may have a moisture content of about 0.5% (total), and a bulk density of about 0.26 gms. per ml.

Another material which can be produced in instantized form is the sweetening product as disclosed in Patent 3,014,803. In such instance the source material can be a syrup containing a mixture of cyclamate and lactose. This material can be spray dried and conditioned to form moist porous aggregates, substantially in the same manner as described above in connection with lactose.

A further product that can be made in instantized form is an instantized dry egg white as disclosed in Patent 2,950,204. Thus lactose can be intermixed with raw egg white to produce a concentrate having substantially equal amounts of albumin and lactose, and which has sufficient fluidity for spray drying. The spray drying operation is carried out to produce a moist discrete material, which thereafter is subjected to a conditioning in the same manner as previously described. The porous aggregates produced by conditioning may have a moisture content of from 15 to 20%. After final drying the moisture content can be reduced to about 5%.

It will be evident that source materials other than those specified above may be treated in accordance with our process to produce valuable instantized products. Such material should meet the conditions that it may be spray dried to form a discrete moist material having a moisture content in excess of about 6%, that when passed through the conditioner, the particles become sticky and adhere together to form firm moist porous aggregates which may have a moisture content within a general range of about 8 to 22%, and that the aggregates remain as such during final drying to provide an instantized dry product having a moisture content that may range from 0.5 to 6%.

Examples of our process are as follows:

*Example 1*

The process was carried out using apparatus substantially as shown in FIGURE 3. Whole milk was concentrated by vacuum evaporation to 46% solids, heated to 160° F. and supplied to the centrifugal atomizer head 42 at the rate of 7,600 pounds per hour. Drying air was supplied to the drying chamber 37 through conduit 38 at a temperature of 290° F., and through conduit 46 at a temperature of 250° F. A commercial soya lecithin manufactured by the W. A. Cleary Co. was fed directly into the atomizer head at a rate of approximately 0.8% providing a lecithin content of approximately 0.5% in the final dried product. Finely ground lactose (325 mesh) was fed into the atomizer through feed line 44 at a rate of approximately 10 gms. per minute. The air sweep 52 was operated at approximately 1 r.p.m. Cooling air at a rate of about 5,000 c.f.m. and a temperature of 85° F. was fed into collecting cyclones 49 and 51 through line 50. Under these conditions, the air discharging from drying chamber 37 through conduit 48 was at a temperature of 130° F. The product discharged from cyclones 49 and 51 had a moisture content of about 8 to 8.5% and was at a temperature of 90° F. The product was transferred to the conditioner by means of belt 57 and the air conveying conduit 22 supplied by blower 23. Ambient room air entered conduit 24 at a rate of 3000 c.f.m. The conditioner was supplied with saturated steam to a one-half inch pipe 26 at a pressure of 90 p.s.i. Within the treatment zone formed by chamber 21 the product was heated to a temperature of about 135° F. and was delivered through outlet 31 at a moisture content of about 12.5%. The product discharging into the tray dryer 33 was in the form of stable moist porous aggregates, the individual particles of which exhibited substantial crystallization of lactose as determined by microscopic examination under polarized light. The drying air supplied to the tray dryer was at a temperature of about 270° F., which served to reduce the moisture content of the agglomerates to approximately 2% moisture (total). The final product was in the form of stable agglomerates having a size such that the bulk of the material remained upon a 100 mesh screen but passed through an 18 mesh screen. The bulk density of the final product was 0.26 gms./ml. The product was tested for wettability by placing 30 gms. on the surface of 210 ml. of water at a temperature of 72° F. contained in a 600 ml. beaker, and noting the length of time required for the product to completely wet and sink spontaneously below the surface of the water. It was found that the average wetting time was about 30 seconds. After sinking below the surface of the water without agitation, the water was stirred with a common spoon to completely disperse the dissolving milk particles. Immediately thereafter the reconstituted product was found to be substantially indistinguishable from fresh whole milk insofar as palatability, appearance and stability were concerned. The solubility index of the final product was about 0.1 ml.

Example 2

Fluid nonfat milk was concentrated by vacuum evaporation to 47% solids, heated to 160° F. and pumped to the centrifugal atomizer head 42 at a rate of 6,800 pounds per hour. Drying air was supplied to the drying chamber 37 through conduit 38 at a temperature of 300° F. and through conduit 46 at a temperature of 230° F. The total volume of drying air thus supplied was 30,000 c.f.m. Seed lactose of 325 mesh size was fed to the atomizer at a rate of about 15 gms. per minute. The air sweep 38 was operated at approximately 1 r.p.m. Cooling air at a rate of about 5,000 c.f.m., and at a temperature of 85° F. was fed into collecting cyclones 49 and 51 through line 50. Under these conditions, the air discharging through the chamber 37 through conduit 48 was at a temperature of 128° F. The moist material discharged from cyclones 49 and 51 had a moisture content of 9.5% and a temperature of 92° F. The material was transferred to the conditioner by means of belt conveyor 57, hopper 25 and fan 23, with air at ambient room temperature at a rate of 3,000 c.f.m. Line 26 was a one-half inch steam pipe supplied with saturated steam and water at a source pressure of 80 pounds per square inch. The material entered the dryer 33 at a temperature of 140° F., with a moisture content of 13.5%, and was in the form of moist, porous aggregates, the individual particles of which showed substantial crystallization of the lactose as determined by microscopic examination under polarized light. The drying air supplied to the tray dryer was at a temperature of about 290° F., which served to reduce the moisture content of the agglomerates to approximately 3.5%. The final product was in the form of agglomerates having a size such that the bulk of the material remained upon a 100 mesh screen but passed through an 18 mesh screen. The final product had a bulk density of 0.24 gm. per ml. The product was examined for wettability by placing 30 gms. upon the surface of 200 ml. of water at a temperature of 72° F. contained in a 600 ml. beaker, and noting the length of time required for the product to completely wet and sink spontaneously below the surface of the water. It was found that a wetting time of approximately 6 seconds was characteristic of the product. After sinking below the surface of the water without agitation, the water was stirred with a common spoon to completely disperse the dissolving milk particles. Immediately thereafter the reconstituted product was found to be substantially indistinguishable from fresh market nonfat milk insofar as palatability, appearance and stability were concerned. The solubility index of the final product was 0.08 ml.

Example 3

Fluid nonfat milk was standardized with cream to provide a finished dry product of approximately 14% fat, which on a fluid milk basis is equivalent to an approximately 1.75% fluid milk product. This material was concentrated by vacuum evaporation to 46.5% solids, heated to 155° F. and pumped through centrifugal atomizer head 42 at a rate of 6,700 pounds per hour. Drying air was supplied to the drying chamber 37 through conduit 38 at a temperature of 295° F. and through conduit 46 at a temperature of 225° F. The total air volume was 30,000 c.f.m. A commercial soya lecithin manufactured by the W. A. Cleary Co. was fed directly into the atomizer at a rate of approximately 200 gms./min. Seed crystals of lactose were fed into the atomizer through feed line 29 at a rate of about 5 gms./min. The sweep 38 was operated at approximately 1 r.p.m. Cooling air at a rate of about 5,000 c.f.m. and a temperature of 82° F. was fed into the collecting cyclones 49 and 51 through line 50. Under these conditions the air discharging from the drying chamber 37 through conduit 48 was at a temperature of 127° F. The product discharged from cyclones 49 and 51 had a moisture content of 8% and had a temperature of 89° F. The product was transferred to the conditioner employed in Example 1 as previously described. The conditioner was supplied with steam and water at a pressure of 85 pounds per square inch. Within the treatment zone the product was at a temperature of 138° F. and assumed a moisture content of 12.5%. As delivered to the dryer the product had a temperature of 115° F. and was comprised of moist porous aggregates, the individual particles of which showed substantial crystallization of the lactose as determined by microscopic examination under polarized light. The drying air supplied to the finish drying system was at a temperature of 290° F. which served to dry the moist, porous aggregates to a moisture content of about 2.1%. The final product was in the form of firm agglomerates having a size such that the bulk of the material remained on a 100 mesh screen but passed through an 18 mesh screen. The bulk density of the final product was 0.25 gm./ml. The product was tested for wettability by placing 30 gms. upon the surface of 265 ml. of water at a temperature of 72° F. contained in a 600 ml. beaker, and noting the length of time required for the product to completely wet and sink spontaneously below the surface of the water. A wetting time of about 6 seconds was characteristic of such products. After permitting the product to sink below the surface of the water without agitation, the water was stirred with a common spoon to completely disperse the dissolving milk particles. Immediately thereafter the reconstituted product was found to be substantially indistinguishable from the original milk product prior to evaporation and drying. The solubility index of the final product was 0.1 ml.

We claim:

1. In a process for the production of instantized products from liquid food material containing substantial amounts of lactose comprising the steps of spray drying the liquid material in a first treatment zone to form a moist discrete material having a moisture content from about 6 to approximately 14%, conveying the moist discrete material to a second conditioning zone and there converting the moist discrete material into moist porous aggregates having an increased moisture content in the range of from about 10 to approximately 18% by moistening and heating said moist porous discrete material to a temperature at which lactose becomes sticky and then removing excess moisture from the aggregates to below approximately 5% to form the desired final instantized product.

2. A process as in claim 1 in which the moist discrete material is converted to the form of moist porous aggregates in said second zone by passing the same in dispersed condition through said zone and by maintaining a hot moist gaseous atmosphere therein, the moist discrete particles in said zone being caused to become sticky and to come into random contacts with each other to form said moist porous aggregates of increased moisture content.

3. A process as in claim 1 in which seed crystals of lactose are incorporated into atomized particles produced in the spray drying operation.

4. In a process for producing dry milk in instantized form from liquid milk, dispersing droplets of milk concentrate containing seed crystals of lactose in a hot drying gas in a first treatment zone, collecting moist discrete material from said drying gas, said discrete material having a moisture content within the range of about 6 to 14% and containing both crystalline and non-crystalline lactose, continuously introducing said discrete material into a second treatment zone, converting the moist discrete material in said second treatment zone into moist porous aggregates having an increased moisture content within the range of about 10 to 18% by dispersing the same in a moist hot atmosphere, the heat and humidity in said second zone being controlled whereby the particles of the material are heated to a temperature level of between 120 and 160° F. and are made sticky and caused to be brought into random contacts to adhere together and form said aggregates, said discrete material when introduced into said second zone being at a temperature substantially less than the temperature which it attains therein and thereafter conveying the aggregates from said second zone and removing excess moisture from the same to form the desired dry product.

5. A process as in claim 4 in which seed crystals of lactose are supplied to said droplets of milk concentrate.

6. A method of producing, without rewetting, a substantially dry milk powder having substantially all of its mass in the form of agglomerated primary spray dry particles, and possessing substantially complete solubility, which comprises the steps of rapidly moving spray formed droplets of milk concentrate containing a controlled quantity of lactose seed crystals through an atmosphere of hot drying gas, providing a temperature for said gas in relation to the lactose seed content of said concentrate that will reduce the moisture content of said droplets to a value within the range of from approximately 6% to approximately 14% at a time during said drying procedure when both crystalline lactose and non-crystalline lactose are present in the particles resulting from said droplets, thereafter and before any substantial change is effected in said particles assuring that the temperature of said particles lies between approximately 85° F. and approximately 125° F., rapidly heating said particles, under conditions which avoid removal of moisture, to a temperature of between approximately 110° F. and approximately 160° F. so as to render tacky the non-crystalline lactose in said particles, intermingling said particles to bring adjacent particles in contact with each other while at said elevated temperature, and while the moisture content thereof is between approximately 10% and approximately 18% so as to cause substantially all of the mass to become firmly associated into agglomerates of particles bonded to each other by the tackiness of the non-crystalline lactose present therein, and thereafter and while the particles are so bonded removing additional moisture from said particles to below approximately 5%, thereby to produce a dry milk powder composed of agglomerated particles.

7. The method of claim 6 further characterized in that the droplets of milk concentrate contain fat in quantity of from about 5 to 40% by weight on a dry basis.

8. The method of claim 6 further characterized in that the droplets of milk concentrate are composed of non-fat concentrated milk.

9. A method as in claim 6 in which the rapid heating of the particles is effected by enveloping the same in a moist hot gaseous atmosphere.

References Cited by the Examiner
UNITED STATES PATENTS

| | | | |
|---|---|---|---|
| 2,835,586 | 5/1958 | Peebles | 99—56 |
| 2,921,857 | 1/1960 | Sharp et al. | 99—203 |
| 3,083,099 | 3/1963 | Swanson et al. | 99—56 |

A. LOUIS MONACELL, *Primary Examiner.*